May 29, 1945.    P. W. GAENSSLE    2,377,140
BRAKE SUPPORT
Filed Sept. 21, 1943
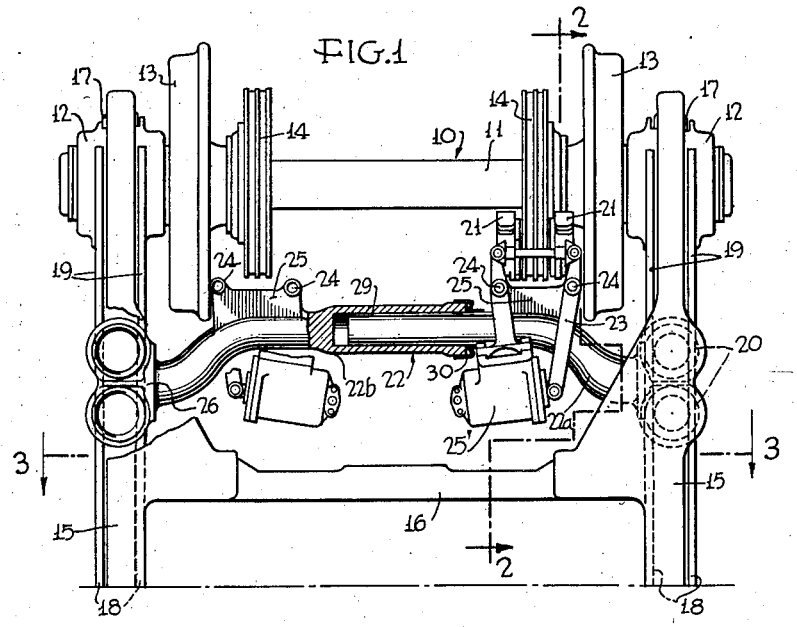
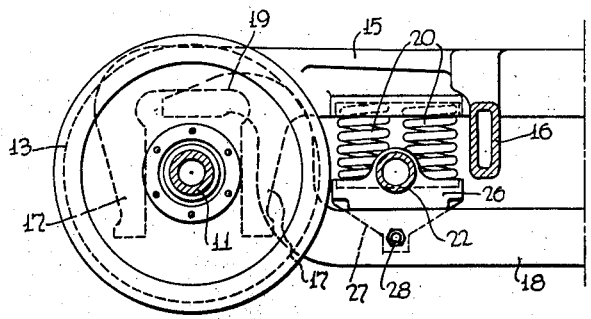
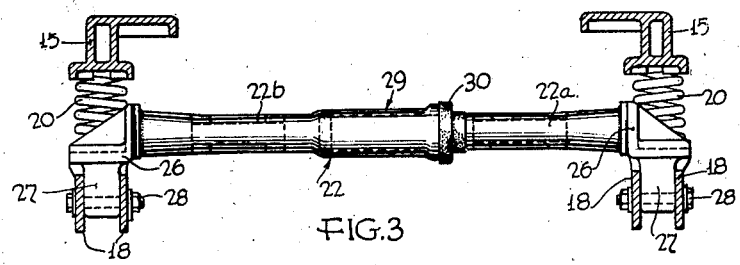
INVENTOR
Paul W. Gaenssle
BY John P. Parkop
ATTORNEY Patented May 29, 1945

2,377,140

UNITED STATES PATENT OFFICE 2,377,140

BRAKE SUPPORT

Paul W. Gaenssle, Detroit, Mich., assignor to Budd Wheel Company, Philadelphia, Pa., a corporation of Pennsylvania Application September 21, 1943, Serial No. 503,205

2 Claims. (Cl. 188—205)

The invention relates to brakes and particularly to a brake support for mounting the non-rotary members of the brake on a railway truck equipped with such brakes.

It is customary to support the truck frame from the wheels and axles at the opposite ends of a railway truck by longitudinally extending side members resting on the ends of the wheel and axle assemblies, these members being commonly called equalizers or equalizer bars. In the operation of the truck over the rails, these equalizers on the opposite sides of the truck may tilt relatively to each other in their vertical planes or may have slight movement in a direction transverse to their length toward or away from each other.

It is an object of the invention to mount the brake support directly on these equalizers and to do this by a simple transverse beam connection extending between the equalizers at the opposite sides of the truck, and to provide for flexibility in this beam connection, whereby it offers no appreciable resistance to the above-described relative movements of the equalizers, and such movements impose no appreciable strains upon the support beam.

Another object of the invention resides in the simplification of the support structure attained in part by the combination of the beam with spring seats, usually associated with such equalizers for resiliently supporting the truck frame from them.

Other objects and advantages and the manner in which they are attained will become apparent from the following detailed description, when read in connection with the drawing forming a part of this specification.

In the drawing:

Fig. 1 is a plan view of one end of a railway truck showing the invention applied thereto, parts being omitted, broken away, or shown in section;

Fig. 2 is a longitudinal vertical sectional view, the view being taken substantially on the line 2—2 of Fig. 1; and Fig. 3 is a transverse vertical sectional view, the view being taken substantially on the line 3—3 of Fig. 1, certain parts beyond the plane of section being omitted.

The railway truck to which the invention is shown applied comprises a usual wheel and axle assembly, designated generally by numeral 10, and including an axle 11 rotating in journal boxes 12 at its opposite ends and carrying wheels 13 inside the journal boxes. Each wheel has associated therewith a rotary brake member or disc 14.

The truck frame supported on the wheel and axle assemblies comprises side frames 15 interconnected by transoms, as 16, the side frames having the usual end pedestals 17 embracing the respective journal boxes, and having a vertically slidable connection therewith.

The frame is supported from the journal boxes 12, through the equalizers or equalizer bars 18 extending longitudinally at the opposite sides of the truck and having their upwardly offset ends, as 19, resting on top of the associated journal box. Pairs of coil springs, as 29 yieldingly support the truck frame from the respective equalizer bars 18, the springs being arranged near the wheel and axle assemblies.

The truck construction, so far described, is largely conventional but a brief description thereof is desirable for a complete understanding of the invention.

According to the invention, the non-rotating brake parts, such as the pairs of shoes, as 21 (only one pair being shown in place in Fig. 1) cooperating with the respective rotary brake discs 14 are mounted wholly on the equalizer bars 18 by a transverse beam support, designated generally by 22. This transverse beam support may have its central portion offset toward the axle, so as to have the end portions thereof lie in the vertical transverse plane between the springs of the pairs, while the portion carrying the shoes is arranged near the peripheries of the discs 14.

The pairs of shoes 21 carried by the support in association with each brake disc 14 are mounted on brake levers 23, pivoted respectively at 24 on a bracket 25 rigid with the beam 22. The levers are actuated to apply the brakes by a cylinder actuator 25' carried by the levers at their ends remote from the shoes.

The inter-acting brake parts and their actuating means are substantially the same as those fully disclosed in Letters Patent No. 2,253,268 for Brake mechanism, granted August 19, 1941, and need no further description.

To simplify the construction of the brake support beam 22, its ends are rigidly united with spring-seating brackets, as 26. These brackets have a wide longitudinal seating, see Fig. 2, on top of the associated equalizer bars 17 and in addition are secured thereto, each by a downwardly projecting lug 27 thereon extending between the two spaced bars forming the equalizer at each side of the truck and a securing bolt 28, see Figs. 2 and 3.

Thus it will be seen that the ends of the supporting beam are supported through the wide bearing seats on the tops of the equalizer bars and the bolts 28 against tilting due to the braking torque, the weight of the truck frame and the parts carried thereby being a further guarantee that the ends of the support do not tilt. In fact, this load on the seats may be said to be the principal resistance to the tilting under the braking torque load.

To avoid the strains upon the supporting beam which would result due to its rigid end connection with the equalizer bars on the opposite sides of the truck, if the beams were rigid throughout, because of the unavoidable relative movements hereinbefore pointed out between said equalizer bars in normal operation, the invention contemplates the formation of the support beam in two parts 22a and 22b having an elongated telescoping connection with each other, at 29, in the region between the brake mounting brackets 25.

This telescoping connection not only permits slight elongation or contraction of the support 22 but also permits relative rotary movement between the parts 20a and 20b. To prevent the entrance of dust or water into the telescoping joint, a suitable rubber or other flexible boot 30 is provided to seal the joint, while permitting the desired relative movement.

The operation of the invention should be apparent from the foregoing detailed description. The telescoping connection between the parts of the supporting beam rigidly mounted at opposite ends on the equalizer bars at the opposite sides of the truck, permits the slight relative tilting of the spaced bars and also their slight relative movement toward or away from each other without placing any appreciable strain on the supporting beam, and without interfering with the free movements of the equalizer bars to accommodate themselves to track irregularities. The single transverse beam support carrying all loading thereon, including the braking torque loading, directly to the equalizer bars provides a very simple light weight construction, particularly when combined as shown and described, with the longitudinally widened spring seats associated with the equalizer bars. The overall weight of the truck is thus kept at a minimum.

While the invention has been shown and described in connection with a specific type of truck, it will be understood that the main features thereof may be applied to other types of trucks in which side members supported by the wheel and axle assemblies have relative tilting and transverse movements when in use, and it is desired in the following claims to cover such modified applications.

What is claimed is:

1. In a brake arrangement for railway trucks, a wheel and axle assembly, longitudinally extending truck side members supported at their ends on the respective ends of said assembly for oscillating movement with respect thereto, a brake rotor carried by said assembly, a brake stator for cooperation with said rotor, and a brake support for said stator having its ends secured through extended connections to the respective side members to prevent rotation of said support under the developed braking torque and to transmit such braking torque to said side members and comprising telescoping parts movable with respect to each other both longitudinally and rotarily.

2. In a brake arrangement for railway trucks, a wheel and axle assembly, longitudinally extending equalizers supported at their ends on the respective ends of said assembly, a pair of brake rotors one carried adjacent each end of said assembly, brake stators for cooperation with the respective rotors, spring seats having wide bearing engagement with the respective equalizers, and a transversely extending brake support for said stators having end portions secured to the respective spring seats so as to prevent rotation thereof under the developed braking torque and each carrying the stators associated with the adjacent rotor, said end portions being freely telescoped and movable with respect to each other both longitudinally and rotarily.

PAUL W. GAENSSLE.